United States Patent
Schwanz et al.

(10) Patent No.: US 6,299,334 B1
(45) Date of Patent: Oct. 9, 2001

(54) VEHICLE LAMP

(75) Inventors: Martina Schwanz, Creuzburg; Markus Brautigam, Immelborn; Peer Quent, Eisenach, all of (DE)

(73) Assignee: Fer Fahrzeugelektrik GmbH, Eisenach (DE)

( * ) Notice: Subject to any disclaimer, the term of this patent is extended or adjusted under 35 U.S.C. 154(b) by 0 days.

(21) Appl. No.: 09/487,293

(22) Filed: Jan. 19, 2000

(30) Foreign Application Priority Data

Jan. 21, 1999 (DE) .............................. 199 02 254

(51) Int. Cl.$^7$ ....................................... F21V 9/00
(52) U.S. Cl. .................... 362/511; 362/555; 362/545; 362/498; 362/494
(58) Field of Search .................... 362/487, 498, 362/540, 543, 544, 545, 551, 555, 511, 31

(56) References Cited

U.S. PATENT DOCUMENTS

| | | | |
|---|---|---|---|
| 4,257,084 | * 3/1981 | Reynolds | 362/31 |
| 4,646,208 | * 2/1987 | Hayashi et al. | 362/80 |
| 4,929,866 | * 5/1990 | Murata et al. | 313/500 |
| 5,165,772 | * 11/1992 | Wu | 362/26 |
| 5,303,130 | * 4/1994 | Wei et al. | 362/494 |
| 5,938,320 | * 8/1999 | Crandall | 362/494 |
| 6,086,229 | * 7/2000 | Pastrick | 362/494 |

* cited by examiner

Primary Examiner—Sandra O'Shea
Assistant Examiner—Ismael Negron
(74) Attorney, Agent, or Firm—Sughrue, Mion, Zinn, Macpeak & Seas, PLLC

(57) ABSTRACT

In a vehicle lamp (7) whose light exit opening (5) is covered by an elongate translucent light exit lens (9) which serves as a light guide for a light source (14) which is arranged at one (12) of its narrow end edges, in such a way that it guides light given off by the light source (14) in the longitudinal direction in such a fashion that a part thereof issues at the narrow end edge (20) in opposite relationship to the coupling-in side while a further part of said light is irradiated through the outside surface (10) of the light exit lens (9), to improve the light output it is provided that the light exit lens (9) is curved transversely with respect to the longitudinal direction and that its inside surface (24) has an optically effective structure (26, . . . , 26) which focuses the light issuing through the outside surface (10) in the cross-sections which are perpendicular to the longitudinal direction into a preferred angular range.

10 Claims, 3 Drawing Sheets

VEHICLE LAMP

BACKGROUND OF THE INVENTION.

The invention concerns a vehicle lamp of the kind set forth in the preamble of the claims.

A specific configuration of such a vehicle lamp is known for example from EP 0 858 932 A2. That involves a flashing lamp which is incorporated into the housing of an external rear view mirror. Such a situation of use involves so little space behind the light exit cover or lens that it is not possible to arrange a light source there and to so surround it with a reflector that the light given off by the light source is substantially uniformly irradiated through the entire area of the light exit lens.

Therefore, disposed in the region of the one narrow end edge is a light source which generally comprises at least one light emitting diode but generally a plurality of light emitting diodes, the light of which is coupled into the light exit lens in such a way that a part of that lens is passed by total reflection to the other narrow end edge at which it issues and is irradiated into a given solid angle. A further part of the coupled-in light is given off in approximately uniformly distributed fashion by way of the outside surface of the light exit lens.

So that a side flashing lamp of that kind can be perceived not just from the front, that is to say viewing in a direction in opposite relationship to the direction of travel of the vehicle, but also from the side, the light exit lens is of an elongate shape and, as viewed from above, it is curved in such a way that the vertical planes in which the narrow end edges thereof extend include an angle of almost 90° with each other.

If the attempt is made to impart a greater curvature to the light exit lens of such a vehicle lamp also in the transverse direction, it is found that for example in the case of a side flashing lamp of the above-indicated kind, the light output in a horizontal direction falls sharply. In order to avoid that, it is thus possible to use light exit lenses which are only slightly curved or flat in the transverse direction, as are known from above-mentioned EP 0 858 932 A2, or it is possible to use more and/or stronger lamp members, for example light emitting diodes, in order to compensate for the light losses which occur due to the irradiation effect in the transverse direction.

SUMMARY OF THE INVENTION

The former approach limits the configurational options for vehicle lamps of that kind to a substantial degree, while the second approach means that the structure of such a lamp becomes more complicated and the manufacturing costs thereof rise.

In comparison the object of the invention is so to develop a vehicle lamp of the kind set forth in the opening part of this specification that, even with a light exit lens geometry which is heavily curved in the transverse direction, distribution of the light in the light guide with minimum losses is possible so that, unlike known designs, the number of light emitting diodes can be reduced and/or lower-strength light emitting diodes can be used.

That object is attained by the features of the invention recited in the claims.

Those measures are based on the realization that, when the light exit lens is also more greatly curved in the transverse direction, a part of the light issuing through the outside surface thereof is given off in the direction of the tangent which can be applied to the curved surface at the relevant point of the outside surface of the light exit lens transversely to the longitudinal direction. In the case of a side flashing lamp in which the longitudinal direction of the light exit lens extends substantially horizontally, this means that, depending on respective curvature involved, a considerable part of the issuing light is irradiated vertically upwardly or downwardly and thus does not contribute to perceptibility of the side flashing lamp in a horizontal direction.

The fact that, in accordance with the invention, the inside of the light exit lens is not in the form of a uniform surface but is provided with an optical structure which focuses the light issuing through the outside in a preferential direction, achieves a light output which is markedly increased in the desired preferential direction, without increasing the amount of space required and without increasing the manufacturing costs, so that the number and/or strength of the light sources can be reduced. At the same time the light exit lens can be curved in all directions substantially more greatly than hitherto so that it can be adapted to the shape or external contour of any parts of the vehicle. That means that substantially fewer limits are imposed on the configurational design options, than is the case in the state of the art.

In a particularly preferred embodiment the vehicle lamp is a side flashing lamp which can be fitted in particular into the housing of a motor vehicle external mirror. The optically effective structure at the inside of the light exit lens is in that case such that, with the light exit lens extending substantially horizontally, the light is focused in a vertical direction so that it issues substantially in a horizontal direction.

The optically effective structure provided on the inside of the light exit lens is preferably formed by a series of strip-shaped regions which are arranged in mutually juxtaposed relationship in the transverse direction and which extend in mutually parallel relationship in the longitudinal direction of the exit lens; in that arrangement each of those regions is arranged tilted in non-parallel relationship with respect to the region of the outside surface, which is immediately opposite thereto.

If the curvature of the light exit lens is irregular in the transverse direction, the strip-shaped regions are tilted to different degrees in dependence on the magnitude of that curvature.

These and further advantageous configurations of the vehicle lamp according to the invention are set forth in the appendant claims.

BRIEF DESCRIPTION OF THE DRAWINGS

The invention is described hereinafter by means of an embodiment with reference to the drawing in which.

DETAILED DESCRIPTION OF THE INVENTION

Figure 1:
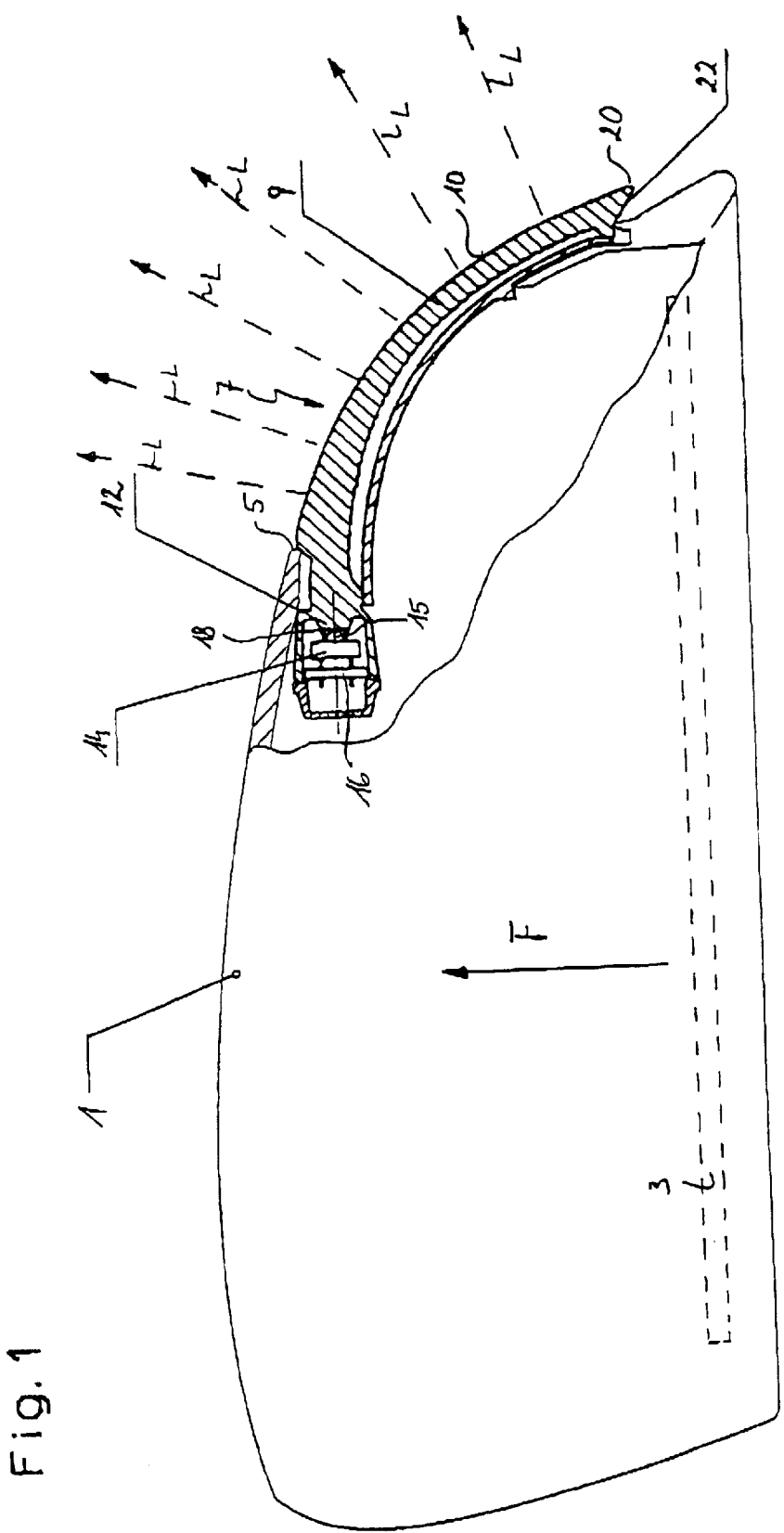
FIG. 1 is a partly sectional plan view of a right-hand vehicle external mirror, into the housing of which is fitted a side flashing lamp according to the invention.

Referring to FIG. 1, diagrammatically shown therein as a plan view is the housing 1 of a vehicle external mirror, as extends towards the right in the assembled condition from the vehicle (not shown) which is at the left. Arranged in the region of the side of the housing which is the lower side in FIG. 1, in the interior of the housing 1, is an adjustable mirror 3 diagrammatically indicted by broken lines. In that respect the arrow F indicates the forward direction of travel of the vehicle.

Figure 3:
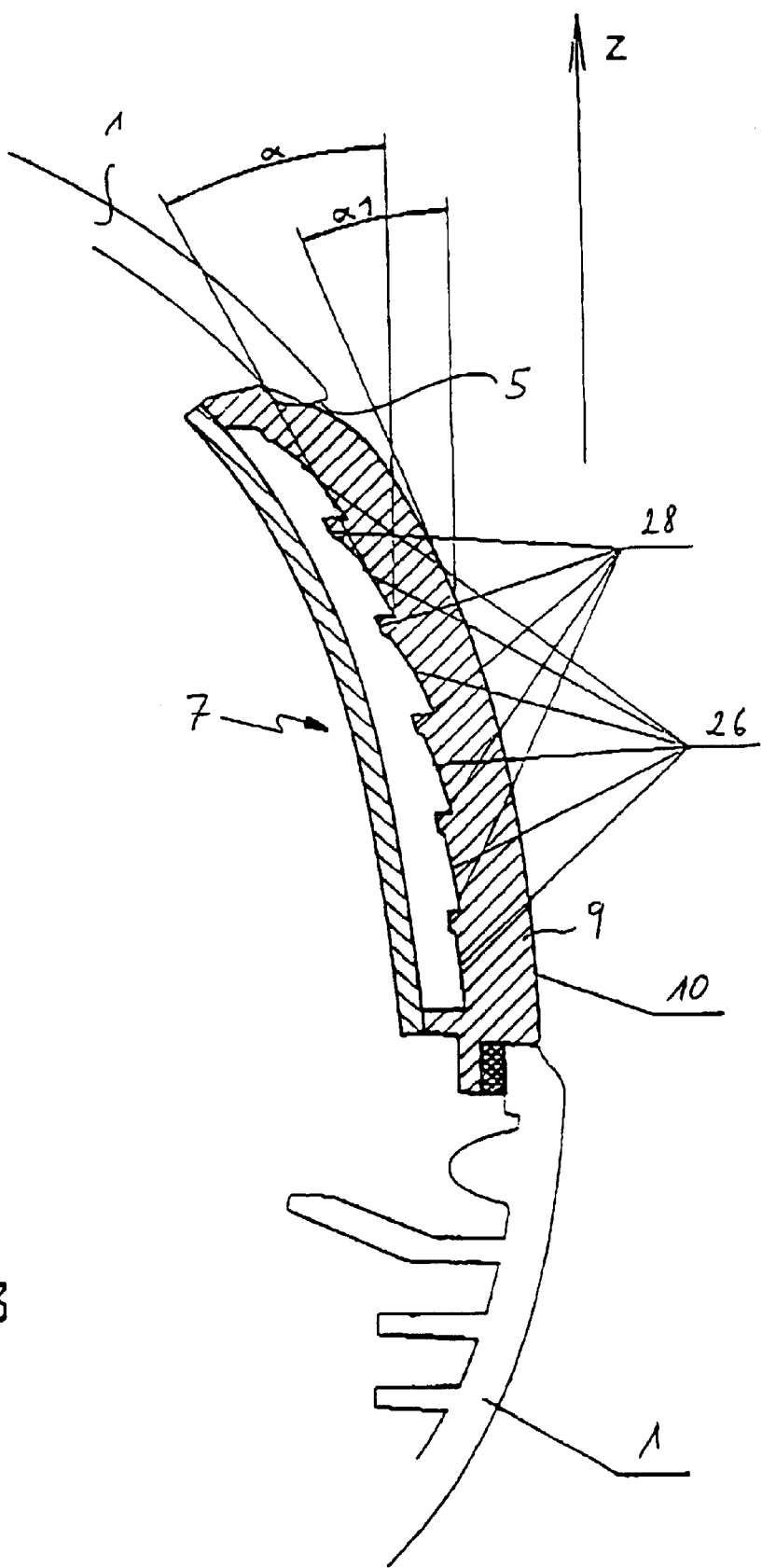
FIG. 3 is a view in section taken along line A—A through the side flashing lamp of FIG. 2.

Fitted into an opening 5 in the housing 1 is a side flashing lamp 7 which is constructed in accordance with the invention, of which the Figure illustrates only the components which are relevant in terms of understanding the invention. They include a light exit pane or lens 9 which is of such a shape that its outside surface 10 approximately continuously extends the outside contour of the housing 1 in the region of the opening 5 which is covered by the light exit lens 9. That applies both in regard to the plane parallel to the section in FIG. 1 and also the plane perpendicular thereto (FIG. 3).

Arranged in the region of the narrow end edge 12 of the light exit lens 9, which is at the left in FIG. 1, is a light source 14 which can comprise a plurality of light emitting diodes 15 which are arranged in mutually superposed relationship perpendicularly to the plane of the drawing in FIG. 1 and of which only one is shown in FIG. 1. Those light emitting diodes are mounted on a carrier circuit board 16 by way of which their switchable power supply is implemented.

Incorporated into the narrow end edge 12 of the light exit lens 9 is a depression 18 which extends in the longitudinal direction of that narrow end edge 12 and into which project the housing portions, which give off the light, of the light emitting diodes 15. That depression 18 thus serves as a coupling-in location through which the light given off by the light emitting diodes 15 passes into the light exit lens 9 which serves as a light guide. A part of that light follows the curved configuration of the light exit lens 9 to the narrow end edge 20 which is opposite to the coupling-in side and at which it issues again. The arc covered by the light exit lens 9 approximately corresponds to an angle of 90° so that the light which is given off by the light emitting diodes 15 substantially transversely with respect to the direction of travel F issues at the end edge 20 substantially rearwardly as viewed in the direction of travel.

Figure 2:
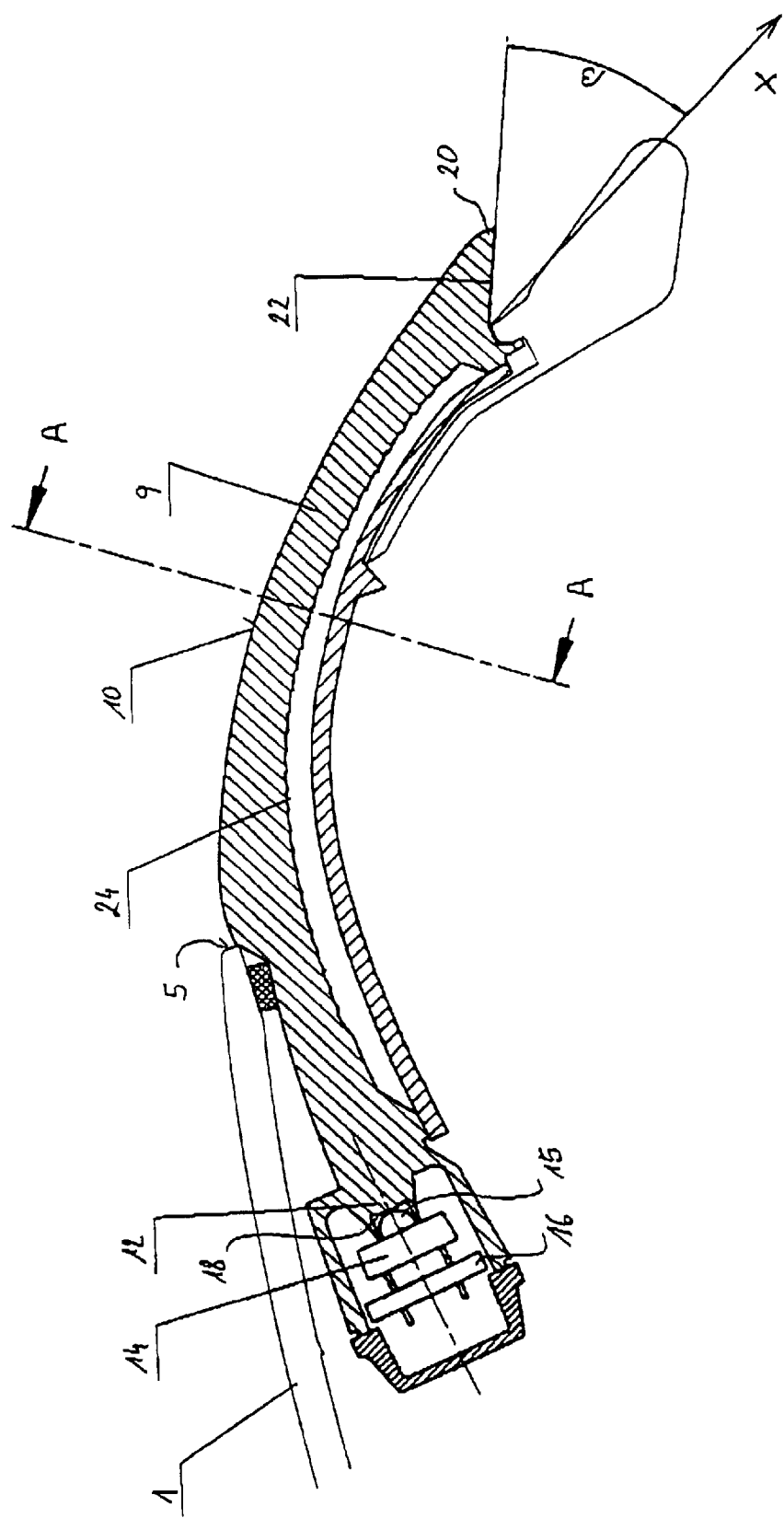
FIG. 2 is a view corresponding to FIG. 1 of the side flashing lamp shown in FIG. 1 on an enlarged scale.

Preferably, the end edge 20 has a coupling-out surface 22 which in the assembled condition extends in a vertical direction and which in the section shown in FIGS. 1 and 2, includes an angle which is different from 90° with the tangent applied to the curvature of the light exit lens 9 in the region of the narrow end edge 20, that is to say, it is tilted towards the vehicle. In that connection, the coupling-out surface 22 projects slightly beyond the outside contour of the mirror housing. That provides that light irradiation is possible in an angular range β which can be of a value of between 5° and 20°, starting from the direction X (see FIG. 2) opposite to the direction of travel F (see FIG. 1).

A further part of the light which is given off by the light emitting diodes 15 and which is coupled into the light exit lens 9 issues through the outside surface 10 of the light exit lens 9, as indicated by the arrows L in FIG. 1.

That light is therefore irradiated with a continuous transition from a direction which is almost parallel to the direction of travel to a direction which is almost perpendicular to the direction of travel.

In the planes which are parallel to the plane of the section in FIGS. 1 and 2, the inside surface 24 of the light exit lens 9 extends with a curvature which approximately corresponds to the curvature of the outside surface 10.

If that were also to apply for the curvature of the inside surface 24 in the planes which are perpendicular to the plane of the section in FIGS. 1 and 2 and of which one is shown in FIG. 3, then a large part of the light issuing through the outside surface 10 would issue upwardly in the direction of the arrow Z in FIG. 3, that is to say viewed from the vehicle, and would thus not contribute to the light irradiation in a horizontal direction, as is required in respect of side flashing lamp.

In order to avoid those light losses therefore in accordance with the invention the inside surface 24 of the light exit lens 9 is provided with an optically effective structure comprising a plurality of mutually parallel strip-shaped curved regions 26 which extend in the longitudinal direction of the light exit lens 9 and which are arranged in mutually vertically superposed relationship and which in the plane of FIG. 3 are of a rectilinear or only slightly curved cross-section and which are arranged in such a way that their direction in that plane which, in the case of curved regions 26, is to be replaced by the direction of the tangent to that curvature, is inclined relative to the vertical Z by an angle α which is larger than the angle $\alpha_1$ which includes with the vertical Z the tangent applied to the corresponding region of the outside surface 10. In that respect, the difference of the angles α from the respective angle $\alpha_1$ is dependent on the curvature of the oppositely disposed region of the outside surface 10 in the respective vertical section plane, and is preferably correspondingly increased in proportion to an increase in that curvature.

For the sake of better definition, the strip-shaped regions 26 can be separated from each other by webs or lands 28 which extend in mutually parallel relationship in the longitudinal direction of the light exit lens 9.

In the embodiment illustrated in FIGS. 1 through 3, the strip-shaped regions 26 are inclined in such a way that they focus light which otherwise would issue upwardly to an excessive extent in a horizontal direction, as is desirable for side flashing lamps.

For other cases of use however the difference in inclination $\alpha - \alpha_1$ of the strip-shaped regions can also be so selected as to afford light irradiation which is increased in the direction of the arrow Z, if that is wanted, in which case then the direction of that arrow Z can also be a direction other than vertically upwardly, depending on the respective position of installation of the vehicle lamp in question.

What is claimed is:

1. A vehicle lamp (7) whose light exit opening (5) is covered by an elongate translucent light exit lens (9) which serves as a light guide for a light source (14) which is arranged at one (12) of its narrow end edges, in such a way that it guides light given off by the light source (14) in the longitudinal direction in such a fashion that a part thereof issues at the narrow end edge (20) in opposite relationship to the coupling-in side while a further part of said light is irradiated through the outside surface (10) of the light exit lens (9), characterised in that the light exit lens (9) is curved transversely with respect to the longitudinal direction, and in that its inside surface (24) has an optically effective structure which is formed by a series of strip-shaped regions (26) of the inside surface (24) of the light exit lens, said inside surface (24) being opposite to the outside surface (10), said regions being arranged in mutually juxtaposed relationship in the transverse direction and extending in mutually parallel relationship in the longitudinal direction of the light exit lens (9), and each of said strip-shaped regions (26) being tilted in non-parallel relationship relative to the region of the outside surface (10), which is immediately opposite to it, the extent (α) of the tilt being different from one strip-shaped region (26) to another in dependence on the curvature transversely with respect to longitudinal direction of the associated region of the outside surface (10), and said optically effective structure focusing the light, issuing through the outside surface (10) in cross-sections which are perpendicular to the longitudinal direction, into a preferred angular range.

2. The vehicle lamp as set forth in claim 1 characterised in that the vehicle lamp (7) is a side flashing lamp 7 whose light exit lens (9) in the assembled condition extends with its longitudinal direction substantially horizontally, and in that the optically effective structure focuses the light issuing through the outside surface into a region which is limited in a vertical direction with a substantially horizontally extending central plane.

3. The vehicle lamp as set forth in claim 1 characterised in that the tilt increases in proportion to an increasing curvature of the associated region of the outside surface (10) transversely with respect to the longitudinal direction.

4. The vehicle lamp as set forth in claim 1 characterised in that the strip-shaped regions (26) of the inside surface (24) of the light exit lens (9) are separated from each other by lands (28) which extend in the longitudinal direction of the light exit lens (9).

5. The vehicle lamp as set forth in claim 1 characterised in that the lamp is arranged in an aperture in a housing (1) of a vehicle external mirror (3).

6. The vehicle lamp as set forth in claim 1 characterised in that the light source (14) comprises at least one light emitting diode (15).

7. The vehicle lamp as set forth in claim 6 characterised in that a coupling-in location in the form of a depression (18) into which the light source (14) projects is provided at the relevant narrow end edge (12) of the light exit lens (9).

8. The vehicle lamp as set forth in claim 1 characterised in that, provided at the narrow end edge (20) opposite to the coupling-in side, is a coupling-out surface (22) which is inclined relative to a plane perpendicular to a tangent to a center line of the light exit lens (9), in order to achieve light irradiation into a preferred solid angle range (β).

9. The vehicle lamp as set forth in claim 8 characterised in that the coupling-out surface (22) is so inclined, relative to a plane perpendicular to the longitudinal direction of the light exit lens (9), that the inside and outside surfaces (24, 10) of the light exit lens (9) are of different lengths in the longitudinal direction.

10. The vehicle lamp as set forth in claim 8 characterised in that the coupling-out surface (22) is so inclined, relative to a plane perpendicular to the longitudinal direction of the light exit lens (9), that the inside surface (24) of the light exit lens (9) is shorter in the longitudinal direction than the outside surface (10).

* * * * *